Aug. 8, 1967
G. G. LANDIS ETAL
3,335,306
ALTERNATING CURRENT POWER SOURCE FOR
ELECTRIC ARC WELDING
Filed Feb. 10, 1965
2 Sheets-Sheet 1
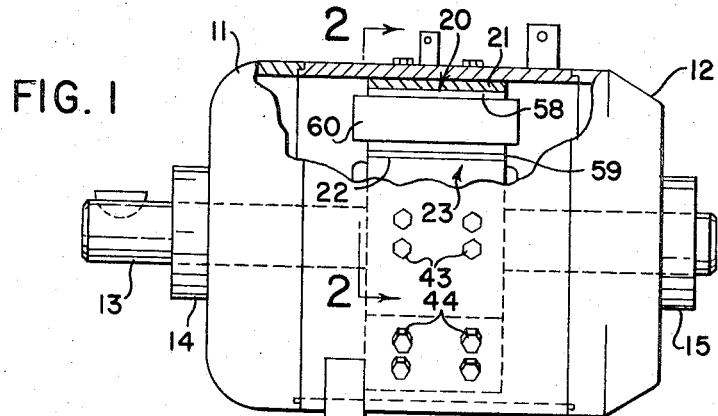
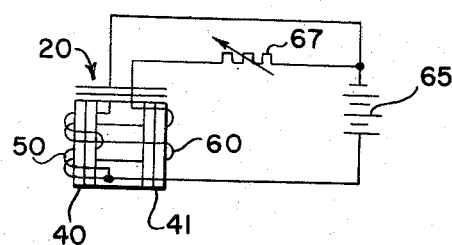
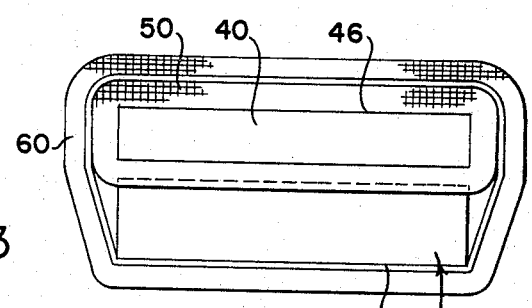
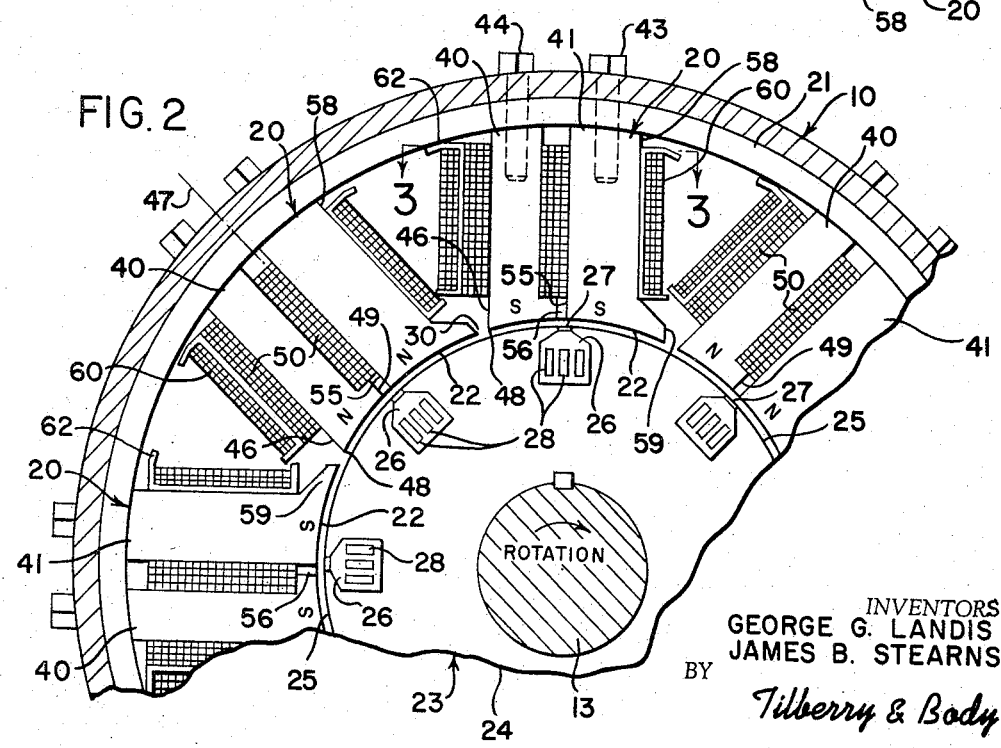
INVENTORS.
GEORGE G. LANDIS &
JAMES B. STEARNS
BY Tilberry & Body
ATTORNEYS

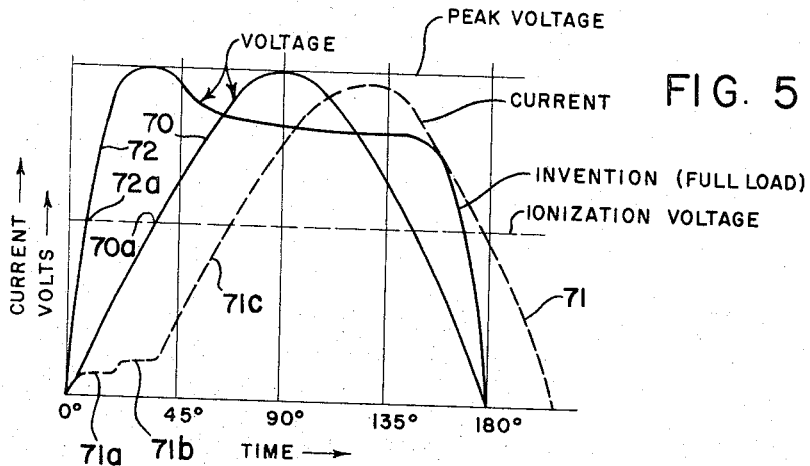
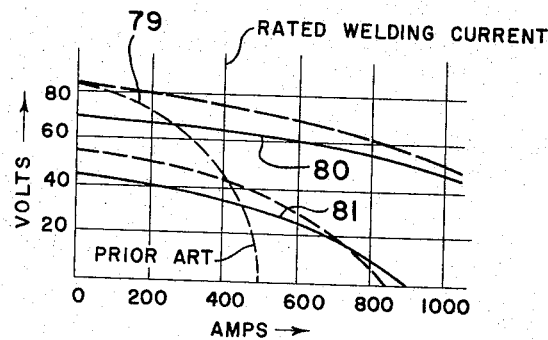
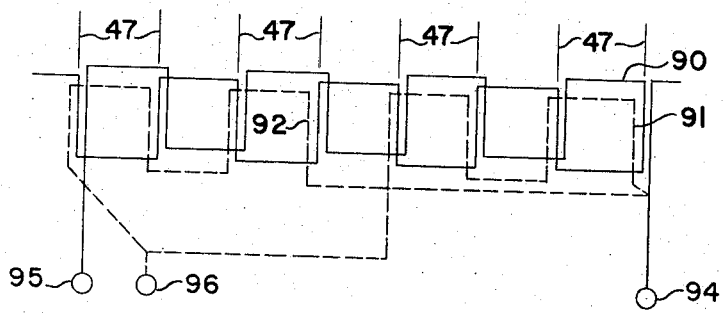

ns Aug. 8, 1967

3,335,306
ALTERNATING CURRENT POWER SOURCE FOR
ELECTRIC ARC WELDING
George G. Landis, South Euclid, Ohio, and James B. Stearns, Brookfield, Wis., assignors to The Lincoln Electric Company, Cleveland, Ohio, a corporation of Ohio
Filed Feb. 10, 1965, Ser. No. 431,640
13 Claims. (Cl. 310—187)

This invention pertains to the art of alternating current electric arc welding and more particularly to a power source for such welding.

The invention is directed both to the electrical characteristics of such a power source as well as to the construction and arrangement of a rotating, alternating current generator and the electrical characteristics part of the invention will be described with particular reference to such a rotating generator, although it will be appeciated that other types of power sources may be employed to give the desired characteristics.

In the art of alternating current arc welding the distortion of the current wave shape caused by ionization delay has adversely affected the quality of the weld bead particularly at high linear welding speeds. This distortion is due to the fact that for welding current to flow a voltage must be applied across the arc gap at least equal to the ionization voltage of the hot gases in the gap, coupled with the fact that when an AC voltage is impressed across the gap, the voltage twice in each cycle passes through zero and for a finite time is at a value less than this ionization voltage.

By the same token, the welding current in the arc goes to zero twice in each cycle and will not re-start in the opposite direction until the voltage across the gap is at or reaches a value in excess of this ionization voltage.

The rise and fall of the voltage in the alternating current power lines is in accordance with the familiar sine wave shape, and examination of such shape shows that the time in each cycle required for the voltage to rise from zero to its maximum is ¼ cycle, or approximately 4,000 microseconds for 60 cycles per second. The time for the voltage to rise from zero to the ionization voltage is a function of the ratio of this ionization voltage to the maximum voltage, for example: if the ratio is 0.707, the time required is ⅛ cycle or 2,000 microsecods; if the ratio is 0.5, the time is 1/12 cycle or 1300 microseconds; and, if the ratio is 0.25, the time is 1150 microseconds.

Heretofore, it has been the normal practice in the art of alternating current arc welding to energize the arc from a high current capacity power source having an open circuit voltage of from 1½ to 5 times the preferred arc voltage, and to provide an inductive reactance in series with the arc having sufficient inductance to cause the voltage to lead the current in the arc in an amount such that when the current reaches zero, the voltage across the arc gap is in excess of the ionization voltage. Thus, the current flow is immediately re-established in the opposite direction.

The use of a power source having a high open circuit voltage is not only dangerous to the welding operator, but results in high peak currents, excessive weld spatter, excessive penetration into the workpiece and a phenomenon called arc blow, which causes the arc to move around and makes welding difficult for the operator.

The large inductive reactor required with high circuit voltages is not only heavy and bulky, but it is also expensive to build and results in a power loss.

Further, the use of a reactor large enough to be effective results in a drooping volt-ampere curve having a short circuit current only slightly greater than the desired or rated current. Small variations in the welding current result in large voltage variations across the gap.

This is an unstable condition in which the welding operator has a difficult time sensing the proper length of arc gap. Also, if the welding operator should happen to touch the end of the welding electrode to the workpiece, the arc is extinguished and the electrode welds itself to the workpiece.

The present invention contemplates an alternating current power source having characteristics which overcome all of the above-referred to difficulties and others and enables high quality alternating current welds to be readily produced.

In accordance with the present invention, an alternating current power source including all of the reactors in series therewith for electric arc welding is provided having the following characteristics:

(1) An open circuit peak voltage 150% or less than the welding voltage;

(2) A voltage wave shape such that the slope of the voltage rise plotted against time is at least greater than the slope of a 120 cycle per second sine wave of the same peak voltage;

(3) A total inductive impedance high enough to shift the phase of the voltage relative to the current so that when the current reaches zero, the voltage across the arc gap is substantially equal to or greater than the ionization voltage of the hot gases in the gap; and, low enough to provide a short circuit to load current ratio of at least 1.5 to 1.

In more limited preferred aspects of the invention, the open circuit peak or RMS voltage is 125% or less than the actual or rated welding voltage, the slope of the voltage rise is equivalent to a 480 cycle or higher sine wave of the same peak voltage and the total circuit impedance is low enough to provide a short circuit to load current ratio of at least two to one.

The invention further contemplates a rotating, alternating current generator which inherently has all of the above-referred to characteristics and which does not require the provision of any external reactance in the welding circuit.

In accordance with the broadest aspects of the invention, a rotating, alternating current generator is provided having a plurality of direct current energized field poles and an armature having an equal number of armature coils with the circumferential spacing of the sides of each coil being equal to the circumferential spacing of the field poles or odd multiples thereof. Thus, both sides of each field coil will be subjected to simultaneous flux reversal as the sides move from under one field pole to under the adjacent field pole.

Further in accordance with the invention, the sides of the armature coils may be slightly skewed relative to the leading and trailing edges of the field poles, such arrangement cutting down the noise created by the generator while surprisingly not adversely affecting the output characteristics.

Further in accordance with the invention, the leading edge of each field pole is closely spaced to the trailing edge of the adjacent field pole so that there will be a maximum rate of flux reversal in each armature coil as the armature coil sides pass from one pole to the next. By closely spaced is meant a spacing not more than four times the air gap between the pole surfaces and the armature and/or the total air gap between adjacent poles is less than ten percent of the total circumference of the armature opening.

Further in accordance with the invention, each field pole is formed into circumferentially spaced portions with the leading portion being magnetically energized to a greater extent than the trailing portion. In a more specific form of the invention, the leading portion has its own filed coil while the field coil for the trailing portion also energizes the leading portion.

Still further in accordance with the invention, an alternating current generator is provided comprised of a plurality of field poles arranged in circumferentially closely spaced relationship around an armature, each field pole being comprised of two circumferentially closely spaced portions, a first coil around the leading portion arranged to be energized such that the first portion is magnetized close to or beyond magnetic saturation and a second coil around both portions and arranged to be energized and control the magnetization of both portions.

The principal object of the invention is the provision of a new and improved alternating current power source for electric arc welding which overcomes the difficulties of the prior art and enables high quality alternating current arc welds to be obtained with the minimum difficulties from ionization delay.

Another object of the invention is the provision of a new and improved rotating alternating current generator which inherently produces a non-sinusoidal voltage wave form having a wave front steeper than a sinusoidal wave front of the same frequency and peak voltage.

Another object of the invention is the provision of a new and improved rotating alternating current generator which inherently produces a non-sinusoidal wave from having a wave front steep enough so that the inherent internal inductance of the generator is sufficient to cause the current to lag the voltage by an amount such that when the current reaches and passes through zero, the voltage across the arc gap will be substantially equal to or in excess of the ionization voltage of the hot gases in the arc gap.

Another object of the invention is the provision of a new and improved rotating alternating current generator power source for arc welding which does not require the use of any reactance intentionally built into the generator or externally used therewith.

Another object of the invention is the provision of a new and improved rotating alternating current generator for electric arc welding wherein the voltage reaches its peak substantially sooner than that of a sine wave for the same frequency and peak voltage.

Another object of the invention is the provision of a new and improved power source for electric arc welding which reduces arc blow.

Still another object of the invention is the provision of a new and improved alternating current generator wherein the slope of the wave front of the voltage as it increases from zero is steeper than the equivalent sine wave at all loading on the generator.

Still another object of the invention is the provision of a new and improved power source for electric arc welding which enables successful alternating current welds to be obtained with the short circuit current being substantially higher than the actual welding current.

A still further object of the invention is the provision of a new and improved power source for electric arc welding wherein successful alternating arc welds may be obtained without the use of the usual drooping volt-ampere relationship.

The invention may take physical form in certain parts and arrangements of parts a preferred embodiment of which will be described in detail in this specification and illustrated in the accompanying drawing which is a part hereof and wherein:

FIGURE 1 is a side elevational view, with portions broken away, of a generator constructed in accordance with the present invention;

FIGURE 2 is a fragmentary cross-sectional view of FIGURE 1 taken approximately in the line 2—2 thereof;

FIGURE 3 is a fragmentary view of FIGURE 2 taken approximately in the line 3—3 thereof, and showing the arrangement of the field coils;

FIGURE 4 is a schematic wiring diagram of the field coils of the generator;

FIGURE 5 is a graph showing a conventional sine wave, the current flow in an arc caused by ionization delay of such a sine wave and the wave shape of the present invention;

FIGURE 6 is a curve showing the volt-ampere relationships of prior art alternating current devices and in accordance with the present invention; and FIGURE 7 is a schematic view showing the winding configuration.

Referring now to the drawings wherein the showings are for the purposes of illustrating a preferred embodiment of the invention only and not for the purposes of limiting same, the figures show somewhat schematically a rotating, alternating current generator comprised generally of a housing 10, end bells 11, 12, and a shaft 13 rotatably supported in bearings 14, 15 mounted respectively in the end bells 11, 12. Mounting feet 16 fastened to the outside of the housing 10 are provided.

The field poles 20 are mounted on the inside of a steel sleeve 21 in turn mounted in the housing 10 and their inner surfaces 22 are so curved as to form a cylindrical opening in which an armature 23 supported on the shaft 13 is rotatable in a clockwise direction as viewed in FIGURE 3. As will appear the direction of rotation relative to the field poles is important so that each field pole has a leading edge facing against the direction of rotation and a trailing edge facing with the direction of rotation.

The armature 23 may take a number of different forms but in the invention shown is comprised of a core of magnetically permeable steel having an outer cylindrical surface 25 of a diameter just less than the diameter of the field poles 20 to provide a clearance therebetween and has a plurality of axially extending coil openings 26 close to the surface 25. The thin web 27 of metal bridging the openings 26 magnetically saturate and are in effect an air gap.

The armature core 24 may be constructed in any desired manner but in the preferred embodiment is comprised of a plurality of laminations of magnetically permeable material stamped to the desired shape with openings for the coil slots and then these laminations are formed into a stack of the desired axial length and welded.

Armature coils 28 are positioned in these openings 26. Each coil has two sides and each side occupies only one coil opening. These sides are spaced a distance equal to the circumferential spacing of these field poles 20 or odd multiples thereof, that is to say the armature coil pitch and pole pitch is the same or odd multiples thereof.

Any number of field poles 20 may be employed depending upon the size of the generator and the output frequency desired, but in the embodiment of the invention shown there are eight of such field poles equally and circumferentially spaced around the inside of the housing 10 and around the armature 23, the number of field poles and the number of armature coils and coil openings are the same.

The actual construction of the field poles 20 may take a number of different forms, but in accordance with the invention and in the preferred embodiment shown, each field pole is comprised of a core formed in two pieces, a leading core 40 and a trailing core 41. Each core portion 40, 41 may be formed from a solid piece of magnetically permeable material such as steel, or from thin laminations of magnetically permeable material such as steel stamped to the shape shown and stacked to the desired axial length.

The outer surface of each portion is drilled and tapped as shown. Bolts 43, 44 extend inwardly through the housing 10 and sleeve 21 into these threaded openings to mount the core portions 40, 41 rigidly relative to the housing. It will be noted that the outer surfaces of the core portions 40, 41 are curved to abut and mate with the inner surface of the sleeve 21, which is of magnetically permeable material, to provide the flux path between adjacent field poles.

The leading surface 46 of the leading field pole portion 40 is generally parallel to the center line 47 of the field pole 20 and forms a relatively sharp leading corner 48 on the leading pole portion 40. The trailing surface 49 of the leading pole portion 40 is parallel to surface 46 and at a point radially spaced from the armature facing surface 22 is cut away to form space for the leading field coil 50 which coil 50 is wound around only the leading pole portion 40.

The trailing pole portion 41 has a leading surface 55 generally parallel to center line 47 and spaced from the trailing surface 49 of the leading pole portion 40 by a small distance to provide a "magnetic air gap" between the leading and trailing pole portions 40, 41. This "magnetic air gap" is preferably filled with an elongated bar 56 of a material having a magnetic permeability of unity or close unity. Stainless steel is preferred. It is tack welded in place.

The trailing surface 58 of the trailing field pole portion 41 is also parallel to the center line 47 and at its inner edge has a lip 59 extending in the direction of rotation to form and to narrow down the gap 30 which in accordance with the invention should be held to a minimum. Thus, the minimum gap is limited only by the problems of flux leakage between poles. The total width of all gaps 30 should not exceed 10% of the total circumference of the pole faces. In the preferred embodiment the gap 30 is approximately 5/16 inch or 4%. The air gap between the pole surfaces and armature surface is necessarily less than this and is approximately .030 inch.

A second field pole winding 60 is wound around both the field pole portions 40, 41 and the leading coil 50 substantially as is shown in the drawing. It will be appreciated that it is possible to provide each field pole portion 40, 41 with its own energizing coil, but the arrangements shown wherein the leading field pole portion 40 has its own coil and the two field pole portions have a common coil is preferred. The coils 50, 60 may, of course, have suitable forms or spools 62 in which they are wound.

The armature coils 28 may be connected in electrical series or in electrical parallel. They may have any desired number of turns to produce a desired output voltage. These coils are then connected to slip rings (not shown) which are engaged by brushes (not shown) all as is conventional in the art. The openings 26 and thus the windings 28 are skewed slightly relative to the leading edge 48 of the poles. Surprisingly such skewing did not change the output characteristics of the generator but did appreciably reduce the audible noise.

FIGURE 4 shows generally the schematic wiring diagram of the field coils 50, 60 of an individual field pole 20. Thus, as shown, the leading field coil 50 which is wound around only the leading pole portion 40 is connected directly to a suitable source of direct current, such as a battery 65. It is here the intention to indicate that when the generator is in operation the leading field coil 50 is fixedly energized. Of course some means for adjusting this coil may be provided.

In accordance with the invention, the energization of the leading field coil 50 is such that considering the number of turns, the current in the coil and the cross-sectional area of the leading pole portion 40, the metal of the leading pole portion 40 operates at all times close to or at magnetic saturation. By magnetic saturation is meant that further increases in the magnetizing force of the coil 50 do not increase the magnetic lines of flux flowing from this pole portion into the armature 23 proportionately to the increase in the magnetic force. The trailing field coil 60 may have its energization varied all the way from zero up to a maximum which will normally be that which would magnetically saturate the trailing field core portion 41. This control of the energization of the coil 60 may be effected by means of a rheostat 67 or by any other suitable means.

With this increase in the energization of the coil 60, it will be appreciated that the magnetic flux from the trailing pole portion 41 will increase from zero up to a maximum where the core 41 is fully saturated. This increase in the excitation of the coil 60 increases the flux in the leading core portion 40 by a small amount. However the core portion 40 is excited well beyond its normal saturation and the demagnetizing force of armature reaction will have little or no reducing effect on the magnetic flux lines in his portion as would be the case if the portion were not subjected to the auxiliary magnetizing force of the leading coil 50. Distortion or reduction of the slope of the steep wave front is thus prevented.

The output frequency of the generator is a function of a number of field poles and the speed of rotation of the armature 23. In the preferred embodiment the output frequency is 120 cycles per second. Obviously any other frequency either higher or lower may be obtained either by changing the number of field poles or speed of rotation or both.

In operation each coil slot as it leaves the trailing edge of a trailing pole portion 41 has the direction of the flux therein abruptly reversed to the full maximum in the opposite direction. The voltage generated in the coil rises abruptly to a maximum, i.e., with a steeper wave front than the equivalent 120 cycle sine wave. In the preferred embodiment measurements have indicated a wave front slope equal to that of a 480 cycle sine wave of the same peak voltage.

Once the coil side is under this leading pole portion, the flux does not appreciably change so that the voltage then tends to remain constant. When the coil then passes under the trailing pole portion 41, the voltage generated in the coil 28 will be that determined by the energization of the field coil 60.

Thus, in operation the generator of the present invention produced a wave which rises with a steep wave front to its maximum value, then the voltage remains generally constant until the field coil 28 comes under the trailing pole portion 41. Then the voltage may either remain in the same or drop down depending on the energization of the coil 60.

It is to be noted that because of the saturation of the corner 48 of the leading pole portion 40, armature reaction (the demagnetizing force of the magnet field around the armature coils) has little or no effect on flux of this corner 48 so that at increased or high current loadings on the generator, the steepness of this wave front is affected but little, if at all, which is in direct contradistinction to that of most generators wherein the armature reaction can considerably distort the shape of the voltage output curve and in a direction which is undesirable for arc welding.

FIGURE 5 shows schematically the arrangement of the armature windings of the preferred embodiment of the invention. Each opening 26 contains three coil sides which coil sides are then interconnected at one axial end of the armature in a manner not shown so that there are in essence three continuous windings on the armature. One winding 90 extends in alternate directions through adjacent coil openings for the full circumference of the armature. Another winding 91 extends one-half the distance around the armature, another winding 92 extends in alternate directions through the other one-half of the openings 26. All the windings connect at one end to slip ring terminal 94 while the other end of winding 90 connects to slip ring 95, the opposite two ends of winding 91 and 92 each connect to slip ring terminal 96. Windings 91 and 92 are thus connected in parallel and there is the equivalent of one-fourth turn per pole with an open circuit voltage of approximately 17 volts. Winding 90 has one turn per pole and an open circuit voltage of approximately 67 volts, the generator thus provides maximum output voltage of 17 volts, 67 volts or 84 volts.

Using the generator of the present invention, it is not necessary to employ an external reactance, nor is it necessary to intentionally build any reactance into the generator itself. Ordinarily the generator has a small inherent amount of inductive reactance. Such inductive reactance is sufficient to cause a slight lag of the current relative to the voltage so that when the current reaches zero, the voltage is already above the ionization voltage of the gases in the arc gap and the current flow in the opposite direction is re-established.

FIGURE 5 shows graphically the time voltage characteristics obtainable using the present invention. Curve 70 is a true sine wave, typical of an alternating current generator at no load and having a maximum open circuit voltage approximately twice the ionization voltage of the materials in the arc gap. This curve crosses the ionization voltage line at the point 70a which, as is obvious from the curve, is approximately 30° after the voltage crosses the zero axis. The corresponding current flow using a transformer power source without external reactance is shown by curve 71. Here the current as it crosses the zero axis first goes to approximately 20 amps as indicated at 71a, then to 30 amps as at 71b. When the AC voltages finally exceeds the ionization voltage, the current rises sinusoidally to the full value in excess of 400 amperes as shown at 71c. It is the pause or delay shown by the portions 71a and 71b that is referred to herein as "ionization delay."

Curve 72 is voltage curve available with the generator of the present invention. This curve crosses the ionization voltage line at the point 72a, which as will be seen, is around 6–8° after the voltage crosses the zero axis.

It will be obvious that using the curve 70 a very substantial amount of external inductive reactance would have to be used in series with the power source in order that the current lag the voltage by at least 40°. On the other hand, using the present invention the natural internal inductance of the generator itself is sufficient to make the current lag behind the voltage by the necessary amount.

The polar enclosure of the curve 72 is much higher than the polar enclosure of the sine curve 70. This results in a much more efficient use of the materials of the generator for a given power output.

It is to be further noted that for the same peak voltage the generator of the present invention has a higher root mean square voltage (R.M.S.) than the equivalent sine wave. Thus the R.M.S. voltage of the generator of the present invention is 0.93 times the peak voltage while the R.M.S. voltage of the equivalent sine wave is 0.707 times the peak voltage.

The power source in accordance with the invention has a very high short circuit current in relation to the welding current which is directly contra to the practice heretofore employed in alternating current welding. Thus, FIGURE 6 shows typical volt ampere curves obtained with a 400 ampere power source. Curve 79 is conventional prior art. The large series inductance required to cause the voltage to lead the current reduces the short circuit current to approximately 125% of the full load welding current. Curves 80, 81 are the power source of the present invention and indicate a maximum and minimum open circuit voltage of approximately 66 and 44 volts and corresponding short circuit currents in excess of 1,000 and 900 amperes. This gives a "stiff" arc making welding much easier because as the arc gap is shortened the current increases to melt off the electrode more rapidly and maintain the gap. Also, if the electrode should strike the workpiece, the current rises to very high values causing the electrode end to practically explode like a fuse and the arc is re-established. With previous arrangements where the short circuit current was only 50% higher than the welding current, the tendency was for the electrode to fuse to the workpiece and the arc went out.

It will be appreciated that the same steep wave front obtainable with the generator of the present invention can also be obtained by employing sinusoidal alternating current having a frequency on the order of 400 cycles or more. However, with such a frequency the inherent inductance of the power source and the power leads are such as result in an inductive impedance giving the same drooping volt ampere curve as shown at 79 in FIGURE 6. Using the present invention at a frequency of 120 cycles per second, the inductive reactance of the generator is so low as to give the required high short circuit current relative to the welding current while at the same time causing the voltage to lead the current by an amount necessary to have the voltage lead the current by an amount necessary to have the voltage at or above the ionization voltage of the gases in the arc gap when the current reaches and passes through zero.

Thus, it will be seen that a preferred embodiment of the invention has been described in sufficient detail to enable a person skilled in the art to duplicate such embodiment and to employ the invention, and which accomplishes all the objectives of the invention heretofore set forth and others.

Having thus described our invention, we claim:

1. An alternating current generator comprised of a plurality of field poles of alternate magnetic polarity arranged around an armature opening, an armature in said opening and having one coil side opening for each field pole, windings in said armature opening, the improvement which comprises: the leading edge of said field poles being spaced from the trailing edge of the adjacent field pole a distance such that the spaces comprise less than 10% of the total circumference of the armature opening.

2. An alternating current generator comprised of a plurality of field poles of alternate magnetic polarity arranged around an armature opening, an armature rotatable in said opening in a predetermined direction, and having one coil side opening for each field pole and coil sides in said openings, each field pole being comprised of a leading portion and a trailing portion, means for magnetizing the leading portion independently of the trailing portion, the leading edge of the leading portion being spaced from the trailing edge of the trailing portion of the adjacent pole by an amount such that the spacing between adjacent field poles is less than 10% of the total circumference of the armature opening.

3. The generator of claim 2 wherein other means are provided for magnetically energizing the trailing portion of each field pole.

4. The generator of claim 2 wherein means are provided for exerting a magnetizing force on both of said field pole portions.

5. The generator of claim 4 wherein said field pole core portions are in circumferentially close spaced relationship and magnetically non-permeable means fill the space adjacent to the cylindrical opening.

6. The generator of claim 4 wherein said field pole leading core portion has a coil there around energizing same to magnetic saturation.

7. An alternating current generator comprised of a plurality of field poles of alternate magnetic polarity arranged with their leading and trailing edges in circumferentially close spaced relationship, a plurality of armature coils movable relative to said field poles and each having a single leading and a single trailing side spaced circumferentially the same distance as the center lines of said field poles.

8. The generator of claim 7 wherein said field poles each include a two part core, namely a leading portion and a trailing portion, a first field coil energizing said leading portion to magnetic saturation and a second field coil variably energizing at least said second portion.

9. The generator of claim 8 wherein said second field coil variably energizes both said core portions.

10. The generator of claim 7 wherein each field pole includes a magnetically permeable core and means for energizing at least the leading edge of said core to magnetic saturation.

11. The generator of claim 10 wherein said field pole trailing core portion has a field coil for varying the magnetic flux therein independently of the field pole leading core portion.

12. The generator of claim 10 wherein a field coil surrounds both said field pole leading and trailing core portions.

13. An alternating current generator particularly adapted for energizing an electric arc comprised of a plurality of field poles in circumferentially spaced relationship and defining a cylindrical armature opening, and an armature rotatable in said opening, said field poles each comprising a leading core portion and a trailing core portion, said armature comprising a core member having coil openings in the periphery thereof, said coil openings being circumferentially spaced the same distance as the circumferential spacing of the center lines of said field poles, armature coil sides in said coil openings, and means for energizing at least the leading field core portion to magnetic saturation.

References Cited

UNITED STATES PATENTS

| 1,112,833 | 10/1914 | Poole | 310—187 |
| 2,939,069 | 5/1960 | Dvoracek | 310—187 |

MILTON O. HIRSHFIELD, *Primary Examiner.*

L. L. SMITH, *Assistant Examiner.*